United States Patent [19]
Fujiki

[11] Patent Number: 5,231,638
[45] Date of Patent: Jul. 27, 1993

[54] ERROR CORRECTION CONTROL APPARATUS

[75] Inventor: Seiju Fujiki, Kawasaki, Japan

[73] Assignee: Fujitsu Limited, Japan

[21] Appl. No.: 505,205

[22] Filed: Apr. 5, 1990

[30] Foreign Application Priority Data

Apr. 11, 1989 [JP] Japan ................................ 1-92277

[51] Int. Cl.⁵ .......................................... H03M 13/00
[52] U.S. Cl. .................................... 371/40.3; 371/37.4
[58] Field of Search ..................... 371/40.3, 37.4, 29.1

[56] References Cited

U.S. PATENT DOCUMENTS

| Re. 28,923 | 8/1976 | Patel | 371/37.4 |
|---|---|---|---|
| 3,800,281 | 3/1974 | Devore et al. | 371/37.4 |
| 3,851,306 | 11/1974 | Patel | 371/40.3 |
| 4,368,533 | 1/1983 | Kojima | 371/37.4 |
| 4,532,629 | 7/1985 | Furuga et al. | 371/37.4 |
| 4,719,628 | 1/1988 | Ozaki et al. | 371/37.4 |
| 4,796,261 | 1/1989 | Moriwaki | 371/37.4 |

FOREIGN PATENT DOCUMENTS

68163/87  1/1987  Australia .
0232133   8/1987  European Pat. Off. .
0272917   6/1988  European Pat. Off. .

Primary Examiner—Charles E. Atkinson
Assistant Examiner—Phung My Chung
Attorney, Agent, or Firm—Nikaido, Marmelstein, Murray & Oram

[57] ABSTRACT

An error correction control apparatus corrects errors based on error correction information contained in transferred information. The error correction control apparatus includes a transfer control part for transferring information on a plurality of tracks in a parallel form, and a plurality of error track pointer circuits. Each of the plurality of error track pointer circuits indicates one of the plurality of tracks having an error to be corrected. Error detectors, detect different types of errors included in the information about a corresponding one of the plurality of tracks and set the plurality of error track pointer circuits to an initial state. An error correction circuit corrects the errors indicated by the based on the error correction information. A reset part selectively resets the plurality of error track pointer circuits based on the reset information.

14 Claims, 10 Drawing Sheets

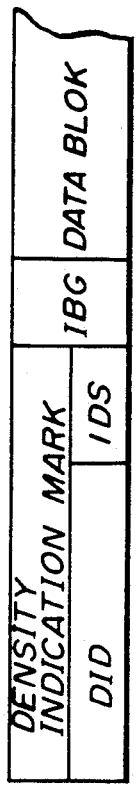
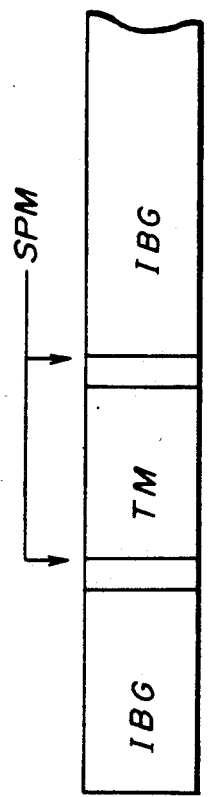
FIG.1A PRIOR ART
FIG.1B PRIOR ART

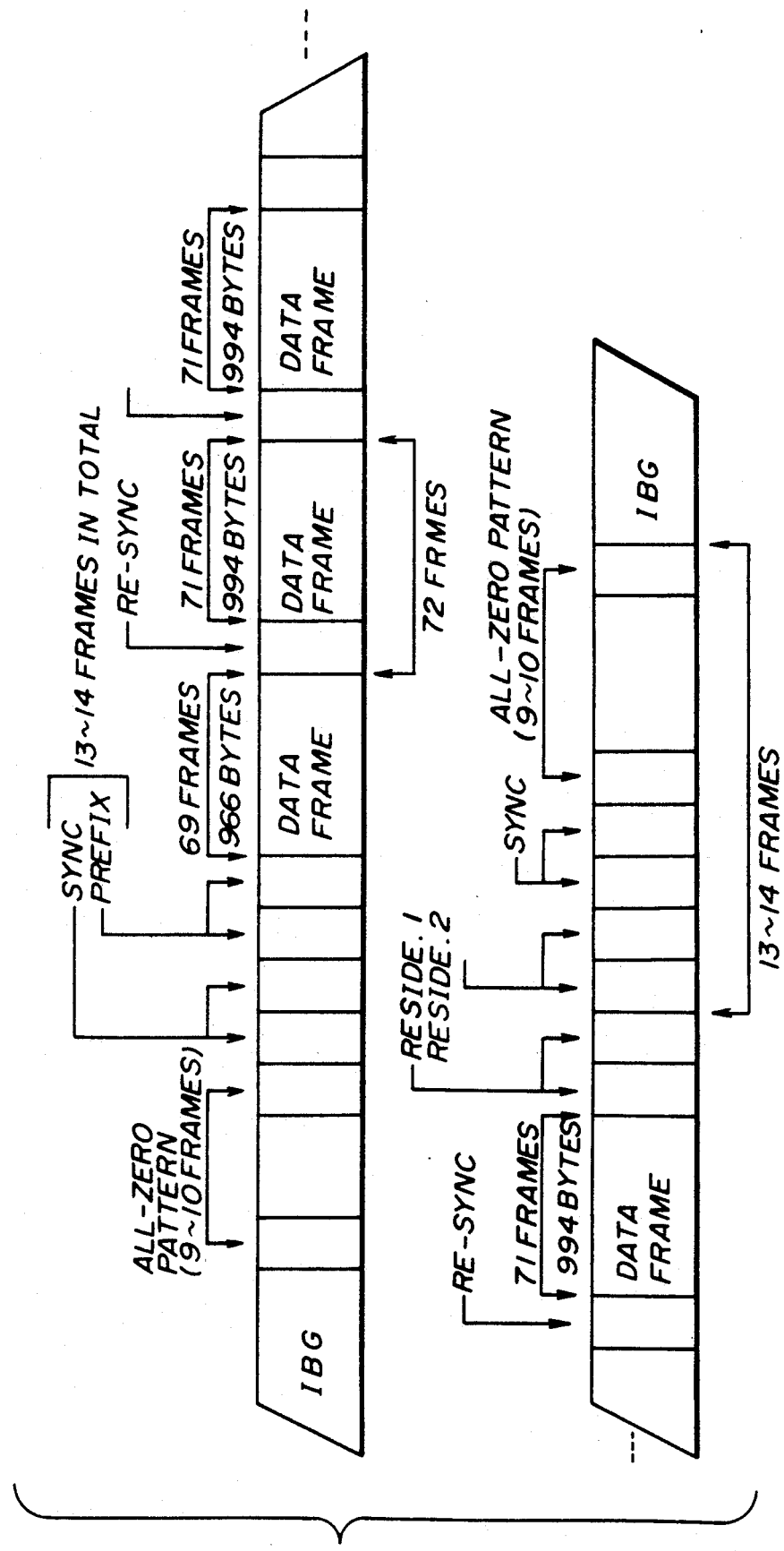
FIG. IC PRIOR ART

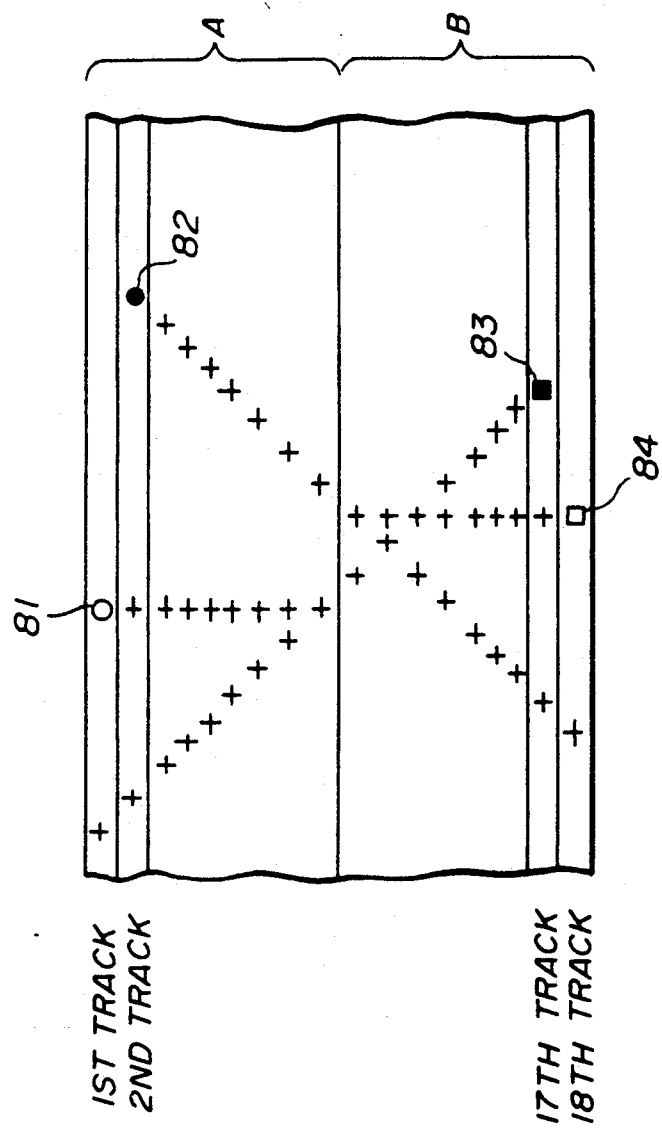

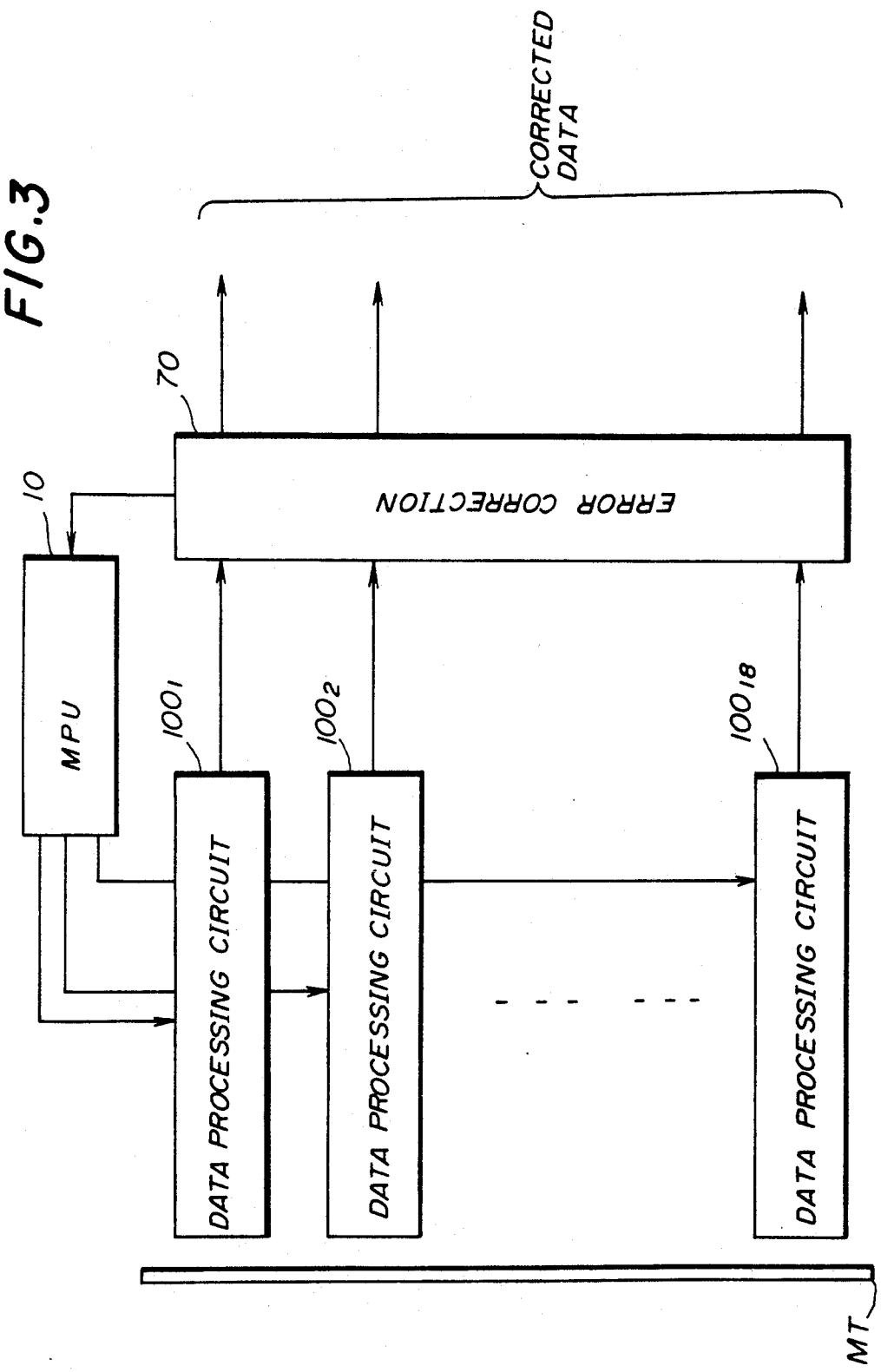

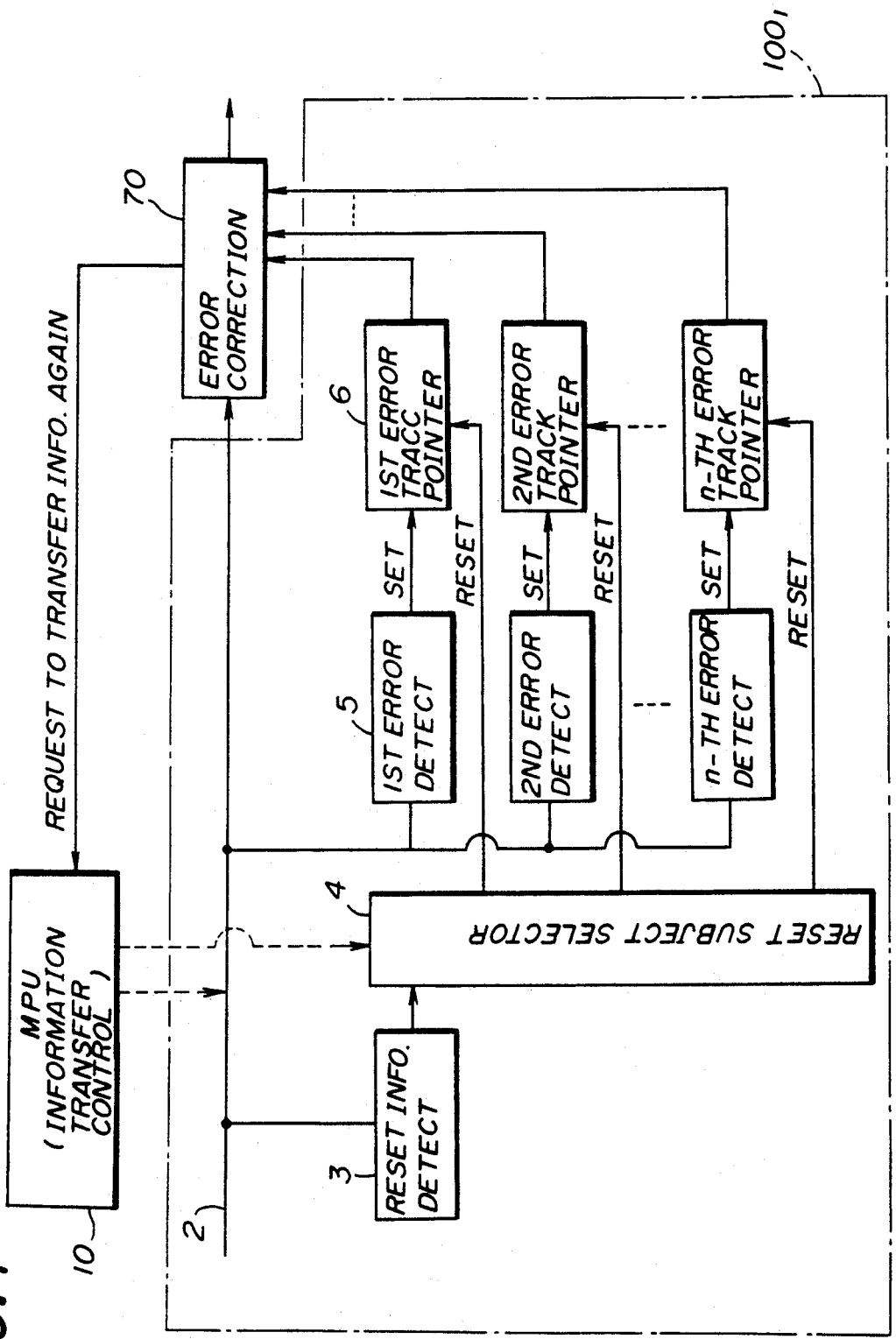

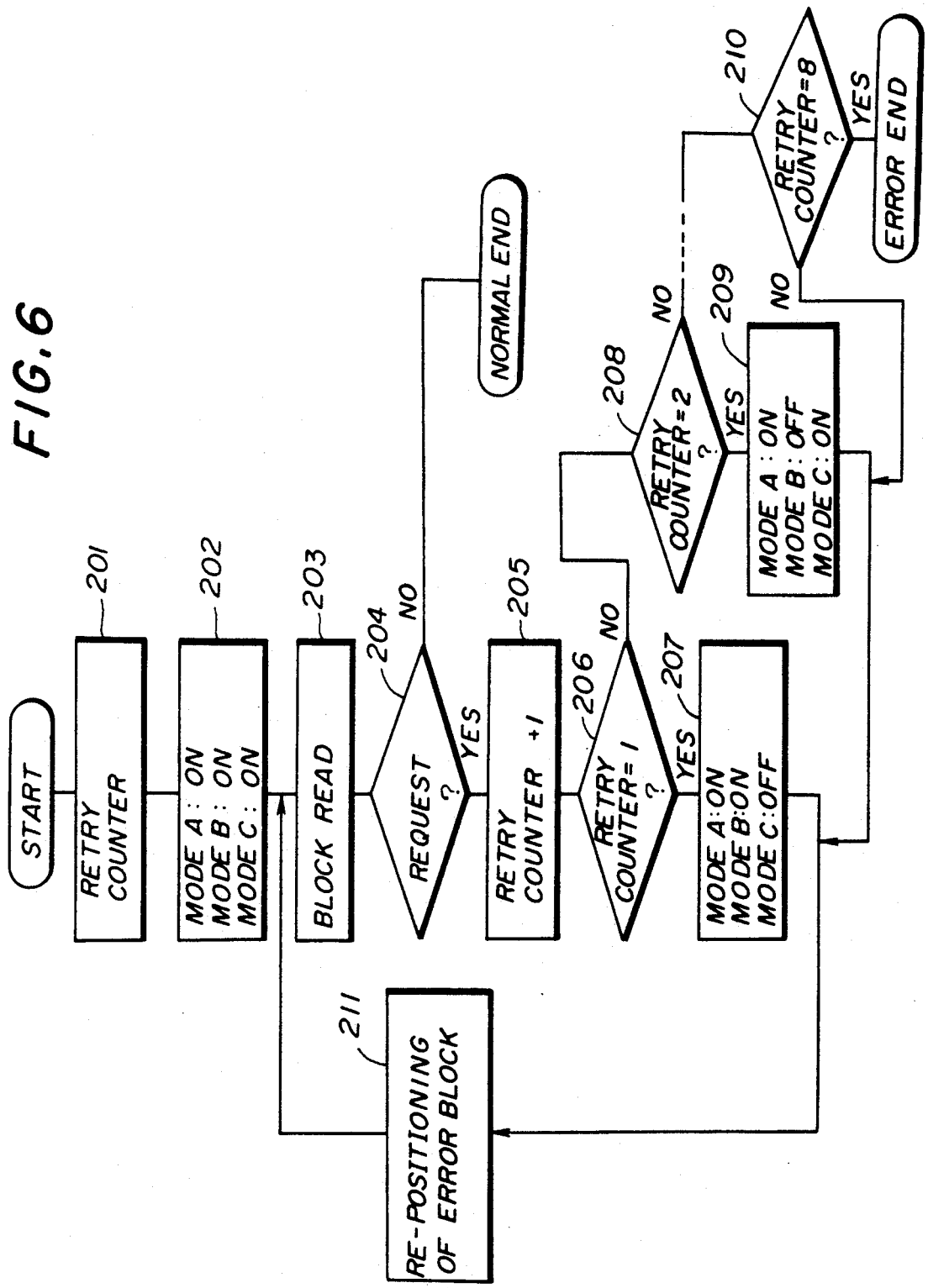

ERROR CORRECTION CONTROL APPARATUS

FIELD OF THE INVENTION

The present invention generally relates to an information transfer system in which information on a plurality of tracks is transferred in a parallel form, and more particularly to an error correction control for correcting errors on the basis of error correction information contained in the transfer information.

BACKGROUND OF THE INVENTION

A magnetic tape recording/reproducing apparatus is widely used as an external memory device of a computer system. Information is recorded on or read out from a plurality of tracks formed on a magnetic tape in a parallel form. It is desired that a magnetic tape recording/reproducing apparatus have a large storage capacity and high reliability.

In a system such as a magnetic tape recording/reproducing apparatus in which information on a plurality of tracks is transferred in parallel form, it is possible to correct errors on up to a predetermined number of tracks by using an error correction code (ECC) or error check information of a parity check code recorded on some tracks. Further, such a conventional system uses an error track pointer so that error correction capability is increased. Normally, the error track pointer is classified into an internal pointer and an external pointer. The internal pointer is provided for each track and generated by a syndrome process. The external pointer is generated by the occurrence of a signal loss resulting from a large defect on a recording medium, the presence of an out-of-phase error and/or the occurrence of a non-tolerable data pattern.

The external pointer is classified into an invalid pointer, a level pointer and a persistent pointer, which are generated by the following detection results. The invalid pointer is generated when data having a pattern other than a predetermined data pattern is detected. The level pointer is generated when a reproduced analog signal is less than a predetermined level. The persistent pointer is generated when a predetermined number of errors is successively detected or a skew error is detected. In this manner, each error track pointer definitely indicates a track on which an error takes place or a track having a possibility of the occurrence of error.

Most errors occur due to a large defect on the magnetic tape, and most error tracks are indicated by the external pointers. When no external pointer is generated, it is possible to correct errors on only a small number of tracks. On the other hand, when an external pointer is generated, a syndrome process is carried out on the assumption that the track indicated by the external pointer is an error track, which means that there is an error thereon. Thus, it is possible to correct errors on an increased number of tracks.

The number of error tracks to be corrected depends on the number of redundant bits so that there is a limit on the number of tracks having errors to be corrected. When error track pointers exceeding the limited number of tracks to be corrected are generated, errors are no longer corrected. Conventionally, error track pointers are reset at predetermined intervals so that the number of error track pointers which an error correction circuit to be notified about is does not become greater than the predetermined number of tracks to be corrected. For example, external pointers are reset for every re-synchronous frame when information transfer conforms to the 18-track GCR (group coded recorder) system.

However, there is a possibility that an error cannot be corrected immediately after external pointers are reset because of an extremely small number of generated external pointers. In this case, the same data block is read again and error correction is retried. This leads to a decrease in operational speed.

SUMMARY OF THE INVENTION

It is a general object of the present invention to provide an improved error correction control apparatus in which the aforementioned disadvantages are eliminated.

A more specific object of the present invention is to provide an error correction control apparatus having an increased error correction capability.

The above-mentioned objects of the present invention are achieved by an error correction control apparatus, comprising transfer control device for transferring information on a plurality of tracks in a parallel form; a plurality of error track pointer circuits provided for each of the plurality of tracks, each of the plurality of error track pointer circuits indicating one of the plurality of tracks having an error to be corrected; and an error detecting device, provided for each of the plurality of tracks, for detecting different types of errors included in the information on a corresponding one of the plurality of tracks and for setting the plurality of error track pointer circuits to a set state. The apparatus also comprises error correcting device, coupled to the plurality of error track pointer circuits, for correcting the errors indicated by the plurality of error track pointer circuits on the basis of error correction information included in the information on the plurality of tracks; and a reset device, coupled to the error detecting device and the error correcting device for each of the plurality of tracks, for selectively resetting the plurality of error track pointer circuits on the basis of reset information included in the information on the plurality of tracks.

Further objects, features and advantages of the present invention will become apparent from the following detailed description when read in conjunction with the accompanying drawings.

BRIEF DESCRIPTION OF THE DRAWINGS

FIGS. 1A through 1D are diagrams illustrating formats of a signal read out from a track formed on a magnetic tape;

FIG. 2 is a diagram showing an AXP code;

FIG. 3 is a block diagram of a general configuration of an error correction control apparatus according to a preferred embodiment of the present invention;

FIG. 4 is a block diagram of a data processing circuit shown in FIG. 3;

FIG. 6 is a flowchart of the operation of the error correction control apparatus shown in FIGS. 4 and 5;

DESCRIPTION OF THE PREFERRED EMBODIMENT

Figure 1D:
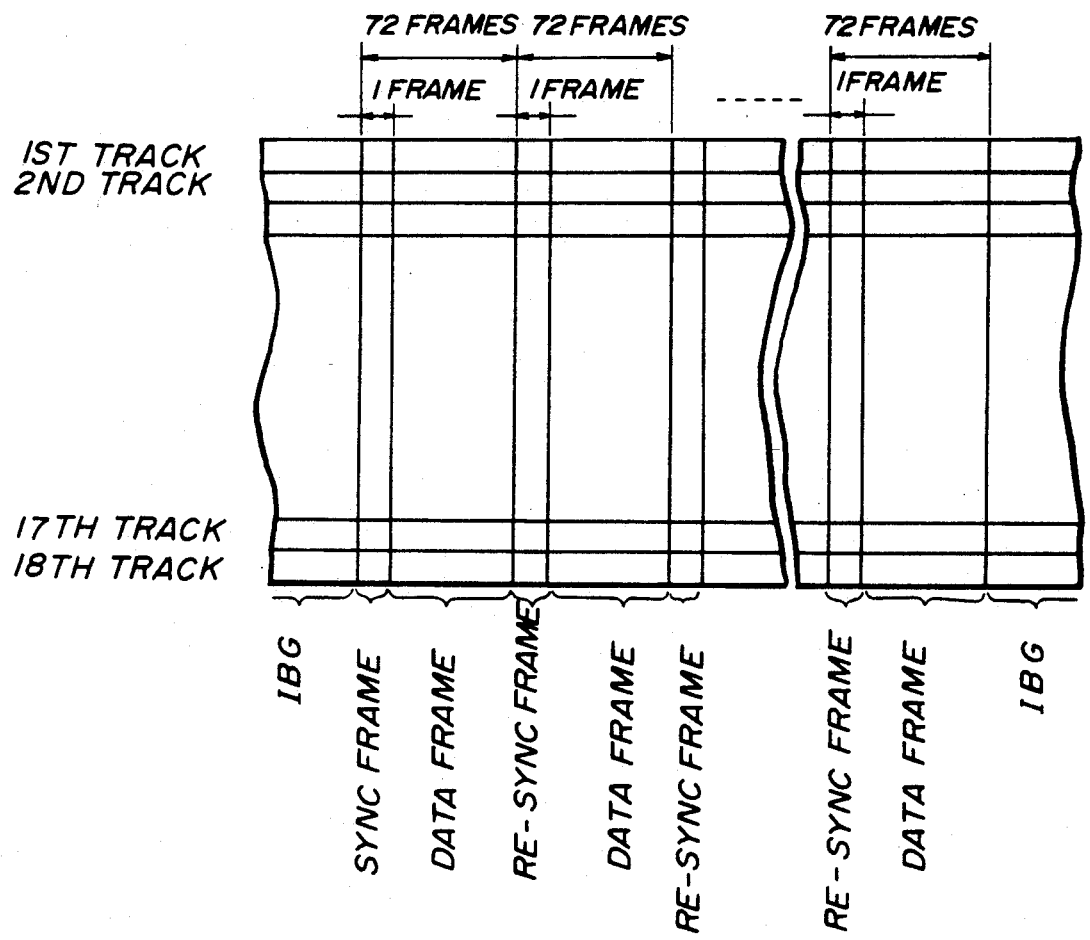

To facilitate understanding of the present invention, a description will now be given of the related art in this field. Referring to FIGS. 1A, 1B, 1C and 1D, there are illustrated recording formats for a magnetic tape in conformity with the ANSI/ISO (18-track GCR system). Referring to FIG. 1A, a density identification (ID) format includes a density indication mark area and an IBG area. The density indication mark area has a density identification (DID) area and an identification separator (IDS) area. FIG. 1B illustrates an IBG/TM (tape map) format, which has two IBG areas, and a TM area. A TM area is provided adjacently between the two IBG areas. A special mark pattern (SPM) area is interposed between the TM area and each IBG area. FIG. 1C illustrates a data format of data provided between adjacent IBGs. FIG. 1D is a diagram of a part of the data format shown in FIG. 1C. Data from magnetic heads are subjected to an 8-9 conversion and then recorded on the first track through the eighteenth track. One frame is composed of nine bits. The beginning of each data block is provided with a predetermined special pattern called a synchronous frame. Another predetermined special pattern called a re-synchronous frame is provided for every 72 frames. The data frame is formed by frames except the synchronous frame and re-synchronous frames.

Each re-synchronous frame is used for resetting error track pointers. Each time a re-synchronous frame is detected, error track pointers are reset so that the number of error tracks indicated by error track pointers does not exceed the number of tracks on which errors can be corrected. That is, error track pointers are generated for tracks each having a possibility that errors occur. From this point of view, in a case where there is actually no error, the number of tracks on which errors can be corrected is greatly limited.

FIG. 2 shows an adaptive cross parity code (hereafter simply referred to as an AXP code). The details of the AXP code are described in Japanese Laid-Open Patent Application No. 54-88109. The AXP code is composed of a vertical parity 81, an oblique parity 82, a reverse oblique parity 83 and a vertical parity 84. When the 18 tracks are grouped into A and B each having nine tracks, the vertical parity 81, the oblique parity 82, the reverse oblique parity 83 and the vertical parity 84 are recorded on the first, second, seventeenth and eighteenth tracks, respectively.

According to the above-mentioned Japanese application, external pointers are handled as known pointers, and internal pointers are handled as unknown pointers. The AXP code has error correction capabilities as follows. When there are three external pointers in one zone and there is a single pointer in each of the remaining zones, errors on four tracks can be corrected. When there are three external pointers in one zone, when there are two external pointers in one zone and there is a single external or internal pointer in each of the remaining zones, or when there are a single external pointer and a single internal pointer in one zone and there is a single internal pointer in each of the remaining zones, errors on three tracks can be corrected. In a case where there are two error track pointers except in a case where two internal pointers are generated in one zone, two or less tracks can be corrected. When error track pointers exceeding the above-mentioned error correction capabilities are generated, errors cannot be corrected. For this reason, external pointers are reset for every re-synchronous frame so that a reduced number of error track pointers is generated and an increased error correction capability is obtained.

Even if errors which are successively present in consecutive re-synchronous frames is generated, external pointers are reset each time the re-synchronous frame appears. Thus, the error correction is limited to errors which can be corrected by only internal pointers. The possibility of the occurrence of errors in consecutive re-synchronous frames is 3/72 when it is assumed that errors take place equally.

In such a case, a disadvantage arising from an excessive supply of external pointers caused when error track pointers are not reset is greater than a disadvantage arising from a shortage of external pointers caused by resetting error track pointers. Thus, conventionally, error track pointers are reset each time the re-synchronous frame is detected. However, there are the aforementioned disadvantages.

A description will now be given of a preferred embodiment of the present invention. Referring to FIG. 3, there is illustrated the entire error correction control apparatus according to a preferred embodiment of the present invention. The error correction control apparatus in FIG. 3 is made up of data processing circuits $100_1$–$100_{18}$, an error correction circuit 70 and a microprocessor unit (hereafter simply referred to as an MPU) 10 for executing an information transfer control. A magnetic tape MT is transported in a direction perpendicular to the drawing.

FIG. 4 is a block diagram of the general structure of the data processing circuit $100_1$. Each of the other data processing circuits $100_2$–$100_{18}$ is configured in the same manner as the data processing circuit $100_1$. An information transmission line 2 of the data processing circuit $100_1$ transfers data from a corresponding one of the tracks (the first track, for example). The data processing circuit $100_1$ includes n error detecting circuits 5, each of which is connected to the information transmission line 2. The error detecting circuits 5 detect error on individual detection manners. That is, the different detecting circuits 5 detects errors on different detection manners. The first to n-th error detection circuits 5 generate set signals, which are supplied to first to n-th error track pointer circuits 6, respectively. Each of the first to n-th error track pointer circuits 6 is set by a corresponding one of the set signals. An error correction circuit 70 corrects errors on a corresponding number of tracks on the basis of signals from the first to n-th error track pointer circuits 6 and error correction (check) information included in the information on the tracks. When errors exceeding the error correction capability of the error correction circuit 70 are generated, the error correction circuit 70 requests the information transfer control circuit (MPU) 10 to have related information transmitted again. A reset subject selecting circuit 4 is controlled by the information transfer control circuit 10, and detects error correction reset information on the 18 tracks. When detecting the error correction reset information, the reset subject selecting circuit 4 generates reset signals having ON/OFF states corresponding to a combination of the first to n-th error track pointer circuits to be reset. For example, when the reset subject selecting circuit 4 generates all the reset signals (ON) which are supplied to all of the first to n-th error track pointer circuits 6, all the first to n-th track pointer circuits 6 are reset. For example, when only the first and second error track pointer circuits 6 are individually supplied with the reset signals, only the first and second error track pointer circuits 6 are reset, and the remaining error track pointer circuits 6 are not reset. In this manner, when a retransmission of data is requested, it is possible to select any combination of the first to n-th error track pointer circuits 6 to be reset. It is noted that according to the aforementioned conventional manner, all the error track pointer circuits are reset each time the re-synchronous frame is detected.

Figure 5:
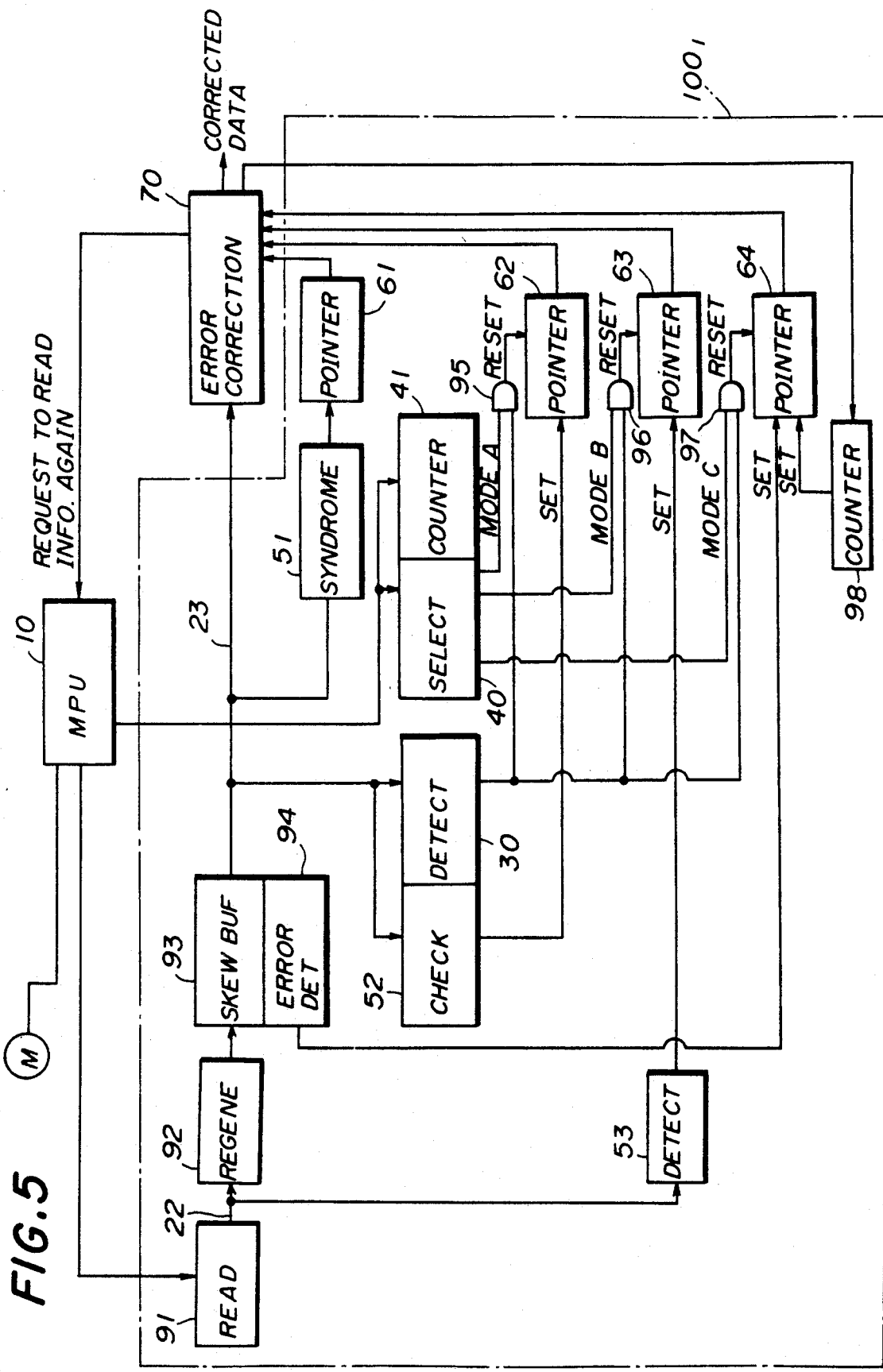
FIG. 5 is a block diagram of the detailed configuration of the data processing circuit shown in FIG. 4.

FIG. 5 illustrates a more detailed structure of the data processing circuit $100_1$. Each of the other data processing circuits $100_2$ to $100_{18}$ is configured in the same manner as the data processing circuit $100_1$. An information reading device 91 includes a read head, which generates an analog signal corresponding to information recorded on a corresponding one of the 18 tracks (the first track, for example). The analog signal is then transferred on a bus line 22. A digital reproduction circuit 92 converts the analog signal on the bus line 22 from the information reading device 91 into a corresponding digital signal, which is supplied to a skew buffer 93. When a predetermined amount of data is written into the skew buffer 93, it outputs the data having a correction unit to the error correction circuit 70.

The structure shown in FIG. 5 has four pointer generators (circuits) 61, 62, 63 and 64 (n=4). The pointer generator 61 is an internal pointer generator 61, which is set by a syndrome processor 51 coupled to the skew buffer 93. The syndrome processor 51 carries out a conventional syndrome process and generates a set signal. The pointer generator 62 is an invalid pointer generator, which is set by a data pattern check circuit 52 connected to the skew buffer 93. When detecting a data pattern on a bus line 23 other than a predetermined data pattern, the data pattern check circuit 52 generates a set signal, which is supplied to the invalid pointer generator 62. The pointer generator 63 is a level pointer generator, which is set by a level detector 53 coupled to the information reading device 91. When detecting a level less than a predetermined level of the analog signal on the bus line 22, the level detector 53 generates a set signal, which is supplied to the level pointer generator 63. The pointer generator 64 is a persistent pointer generator, which is set by a skew error detector 94 and an error correction counter 98. When detecting a skew error, the skew error detector 94 coupled to the skew buffer 93 generates a set signal, which is supplied to the persistent pointer generator 64. The error correction counter 98 receives a signal which is generated each time an error is corrected. When counting a predetermined number of errors which successively occurs, the error correction counter 98 generates a set signal, which is supplied to the persistent pointer generator 64. When error correction is successively made over 8 bytes within the same track, for example, the error correction counter 98 generates the set signal.

A re-synchronous frame detector 30 detects each re-synchronous frame in information on the bus line 23. Each time the re-synchronous frame is detected, the re-synchronous frame detector 30 generates a reset signal. AND gates 95, 96 and 97 each having two input terminals are provided for the invalid pointer generator 62, the level pointer generator 63 and the persistent pointer generator 64, respectively. The reset signal is supplied to the input terminals of the AND gates 95, 96 and 97, which are respectively supplied with a mode-A signal, a mode-B signal and a mode-C signal, all of which are generated by a reset subject selector 40. When the mode-A signal applied to the AND gate 95 is OFF, the reset signal from the re-synchronous frame detector 30 is inhibited from passing therethrough so that the invalid pointer generator 62 is not reset. On the other hand, when the mode-A signal is ON, the reset signal from the re-synchronous frame detector 30 passes through the AND gate 95 so that the invalid pointer generator 62 is reset. In the same manner, the level pointer generator 63 and the persistent pointer generator 64 are controlled by the mode-B signal and the mode-C signal, respectively.

The reset subject selector 40 cooperates with a retry counter 41, and generates any combination of the ON/OFF states of the mode-A, mode-B and mode-C signals based on the counter value in the retry counter 41. When the MPU 10 instructs the information read device 91 to read information on the corresponding track again, the MPU 10 generates an instruction (pulse) which increments the counter value by +1 on the basis of a microprogram control, for example.

A description will now be given of a control for selecting combinations of the mode-A, mode-B and mode-C signals with reference to FIG. 6. The control commences to initialize the retry counter 41 so that the counter value is set to zero (step 201). When the counter value is zero, all the mode-A, mode-B and mode-C signals are ON (step 202). In this state, the data block shown in FIG. 1D is read (step 203). Since all the mode signals are ON, all the pointer generators 62, 63 and 64 are reset when the re-synchronous frame is detected by the re-synchronous frame detector 30. When no request to read information again is generated during reading of the data block, the reading operation is correctly finished (step 204). On the other hand, when a request to read information again is generated (step 204), a motor M for driving the magnetic tape MT is reversely driven so that the information reading device 91 is positioned at a place related to the counter value in the retry counter 41 (step 211). The ON/OFF state of each of the mode signals depends on the counter value in the retry counter 41, as will be described in detail below. Then, the MPU 10 increments the counter value in the retry counter 41 by +1 (step 205).

After the retry counter 41 is incremented by +1 at step 205, the reset subject selector 40 determines whether the counter value in the retry counter 40 is equal to 1 (step 206). When the result at step 206 is YES, the reset subject selector 40 sets the mode-A, mode-B and mode-C signals ON, ON and OFF, respectively (step 207). On the other hand, when the result at step 206 is NO, the control proceeds to step 208, at which it is determined whether the counter value in the retry counter 208 is equal to 2. When the result at step 208 is YES, the reset subject selector 40 sets the mode-A, mode-B and mode-C signals ON, OFF and ON, respectively (step 209). In this manner, when the retry counter 41 is a counter value between 1 and 8, a corresponding combination of the ON/OFF states of the mode-A, mode-B and mode-C signals is determined. It should be noted that when the counter value in the retry counter 41 is not equal to 8, the control proceeds to step 211. On the other hand, when the counter value in the retry counter 41 is equal to 8, existing errors cannot be corrected by any combination of the mode-A, mode-B and mode-C signals and the control is ended as an error end.

In this manner, eight combinations of the ON/OFF states of the mode-A, mode-B and mode-C signals are selectively determined on the basis of the counter value in the retry counter 41. It is possible to arbitrarily select any combination of the ON/OFF states of the mode-A, mode-B and mode-C signals on the basis of the counter value in the retry counter 41. For example, all the mode signals are set OFF initially. The pointer generators 62, 63 and 64 are not reset in response to the detection of the the re-synchronous frame. In this case, it is possible to add an error track pointer generator which is reset each time a request to read information again is generated. It is preferable that a sequence of selecting one or more selecting generators 62-64 be directed to reducing the number of times that the request to read information again is generated. In actuality, some error track pointers certainly indicate the real occurrence of errors, and some error track pointers indicate a possibility of the occurrence of errors. The selecting sequence is determined, taking into account these characteristics of the error track pointers to be used.

Figure 7A:
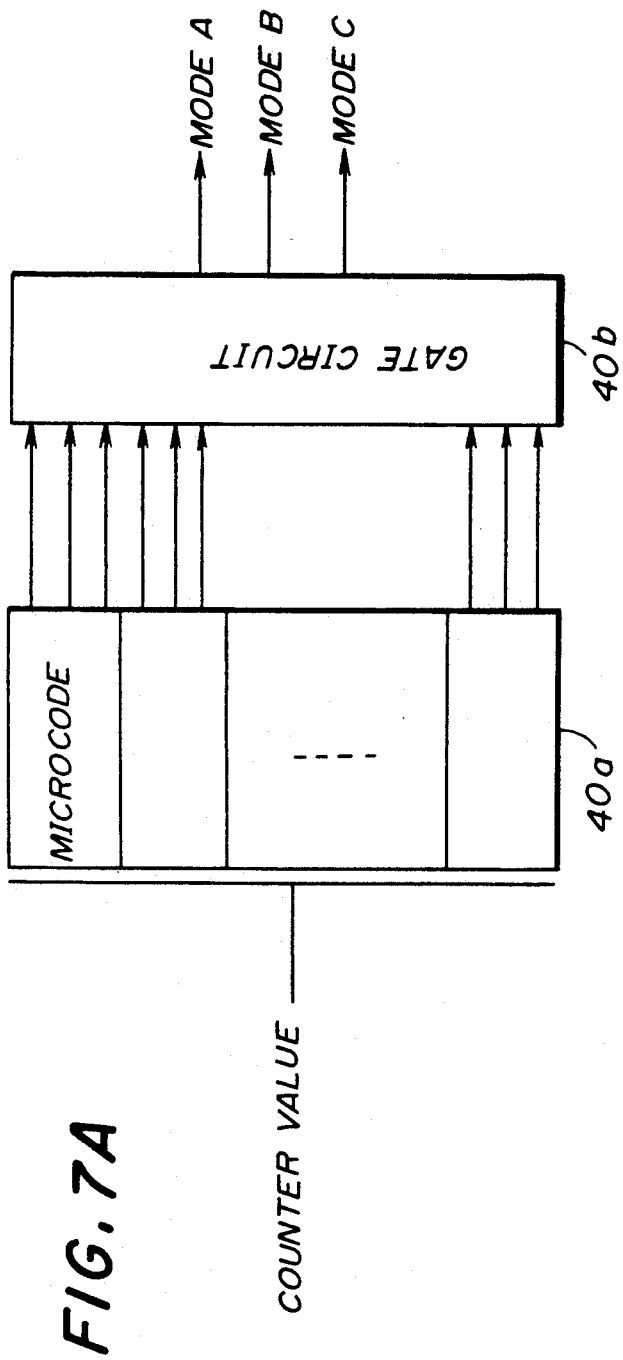
FIGS. 7A and 7B are block diagrams of alternatives of a reset subject selector shown in FIG. 5.

FIG. 7A is a block diagram of the structure of the reset subject selector 40 shown in FIG. 5. A microprogram 40a has microcodes, each of which has data relating to a corresponding one of the combinations of the ON/OFF states of the mode-A, mode-B and mode-C signals. The microprogram 40a is accessed by the counter value from the retry counter 41. That is, one of the microcodes is selected by the counter value in the retry counter 41. A gate circuit 40b such as an OR gate passes one of the microcodes from the microprogram 40a.

Figure 7B:
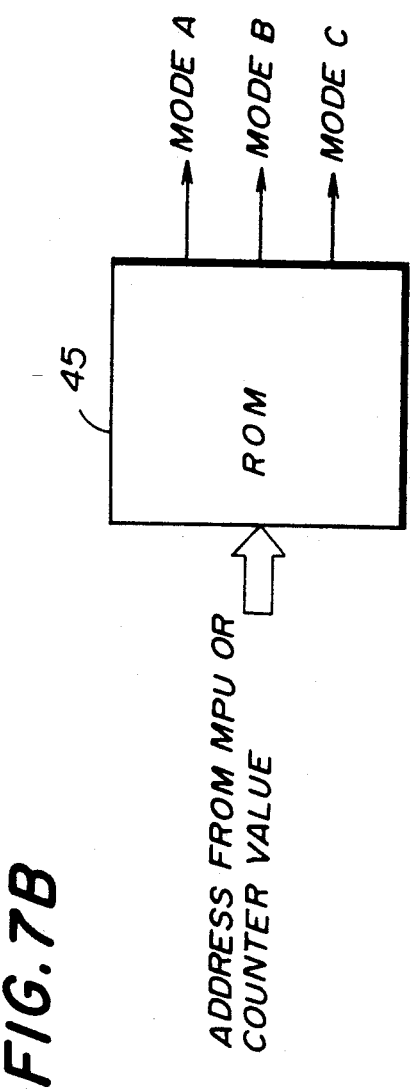

FIG. 7B is a block diagram of a configuration which is substituted for the reset subject selector 40 or the combination of the reset subject selector 40 and the retry counter 41. A ROM 45 is supplied with an address signal from the MPU 10 or the counter value in the retry counter 41. The address signal from the MPU 10 depends on how many times the request to read information again is supplied from the error correction circuit 70. A three-bit output signal based on the value of the address or the counter value in the retry counter 41 is read out from the ROM 45.

Figure 8:
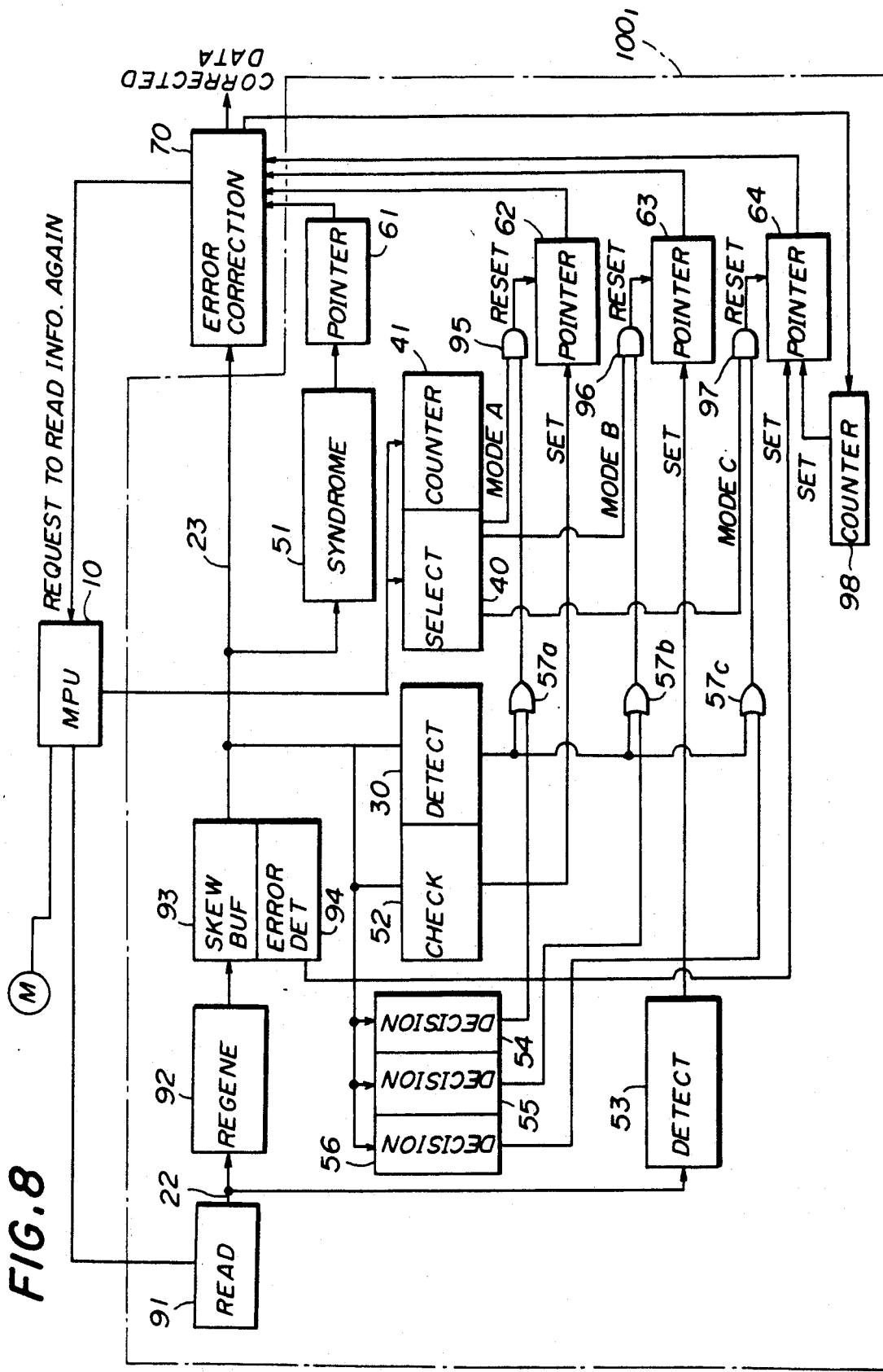
FIG. 8 is a block diagram of a variation of the configuration shown in FIG. 5.

FIG. 8 is a variation of the configuration shown in FIG. 5. Decision circuits 54, 55 and 56 are provided for the pointer generators 62, 63 and 64, respectively. The decision circuits 54, 55 and 56 have input terminals connected to the bus line 23, and determine whether the pointer generators 62, 63 and 64 are to be set on the basis of individual decision conditions. Output signals (set signals) from the decision circuits 54, 55 and 56 are supplied to OR gates 57a, 57b and 57c, respectively. The reset signal from the re-synchronous frame detector 30 is applied to the OR gates 57a, 57b and 57c. Output signals of the OR gates 57a, 57b and 57c are applied to the AND gates 95, 96 and 97. With the structure shown in FIG. 8, it is possible to reset the pointer generators 62, 63 and 64 on the basis of the individual set conditions in addition to the set condition determined by the re-synchronous frame detector 30.

Each of the pointer circuits 6 can be a flip-flop or a register. The number of tracks on the magnetic tape MT is not limited to 18. The types of error track pointers are not limited to the specifically described error track pointers. The condition on whether each error track pointer should be reset can be arbitrarily determined.

The present invention is not limited to the specifically described embodiments, and variations and modifications may be made without departing from the scope of the present invention.

What is claimed is:

1. An error correction control apparatus, comprising:
   transfer control means for transferring information about a plurality of tracks in a parallel form, said information including data and reset information;
   a plurality of error track pointer circuits each indicating one of said plurality of tracks having an error to be corrected;
   error detecting means, connected to each of said plurality of error track pointer circuits, for detecting different types of errors included in said information about a corresponding one of said plurality of tracks and for setting said plurality of error track pointer circuits to a set state;
   error correcting means, coupled to said plurality of error track pointer circuits, for correcting said errors indicated by said plurality of error track pointer circuits on the basis of error correction information included in said information about said plurality of tracks, said error correcting means including generating means for generating a request for said transfer control means to transfer said information again and
   reset means, coupled to said error detecting means and said error correcting means, said reset means for selectively resetting or not resetting any combination of said plurality of error track pointer circuits based on reset information included in said information about said plurality of tracks, said reset means including means for selecting said any combination based on how many times said request is generated from said request generating means.

2. An error correction control apparatus as claimed in claim 1, wherein said reset means comprises counter means for counting a number of times that said request is generated from said request generating means and for generating a counter value, and wherein said selecting means selects any combination of said plurality of error track pointer circuits to be reset based on said counter value from said counter means.

3. An error correction control apparatus as claimed in claim 1, wherein said reset means comprises:
   detecting means for detecting predetermined frame data included in said information and for generating a reset signal each time said predetermined frame data is detected;
   generating means for generating mode signals corresponding to said different types of errors based on said reset information included in said information about said plurality of tracks, one of said mode signals being related to a corresponding one of said error track pointer circuits; and
   gate means, coupled to said detecting means and said generating means, for performing a logic AND operation between said reset signal and each of said mode signals and for outputting a logic AND operation result for each of said mode signals to a corresponding one of said plurality of error track pointer circuits so that each of said plurality of error track pointer circuits is reset by said logic AND operation result.

4. An error correction control apparatus as claimed in claim 3, wherein said predetermined frame data occurs at predetermined intervals.

5. An error correction control apparatus as claimed in claim 3, wherein said information on said plurality of tracks data frames having a predetermined length and re-synchronous frame patterns each synchronizing one of said plurality of data frames, and wherein said predetermined frame data corresponds to said re-synchronous frame patterns.

6. An error correction control apparatus as claimed in claim 1, wherein said reset means comprises:
   storage means for storing data indicating combinations of said plurality of error track pointer circuits to be reset; and
   address generating means, coupled to said storage means, for deriving an address signal from said reset information included in said information on said plurality of tracks,
   said address signal indicating one of said combinations of said plurality of error track pointer circuits to be reset.

7. An error correction control apparatus as claimed in claim 6, wherein said storage means comprises a read only memory.

8. An error correction control apparatus as claimed in claim 6, wherein said storage means comprises a microprogram.

9. An error correction control apparatus as claimed in claim 1, wherein said reset means comprises:
   decision means, for determining whether a corresponding one of said plurality of pointer circuits should be reset on the basis of a corresponding decision and for generating a decision signal;
   detecting means for detecting predetermined frame data included in said information and for generating a reset signal each time said predetermined frame data is selected;
   generating means for generating mode signals corresponding to said different types of errors on the basis of said reset information included in said information on said plurality of tracks, one of said mode signals being related to a corresponding one of said error track pointer circuits;
   first gate means, coupled to said decision means and said detecting means, for performing a logic OR operation between said decision signal and said reset signal and for generating a logic OR operation result; and
   second gate means, coupled to said first gate means and said generating means, for performing a logic AND operation between a corresponding one of said mode signals and said logic OR operation result and for outputting a logic AND operation result so that a corresponding one of said error track pointer circuits is reset by said logic AND operation result.

10. An error correction control apparatus as claimed in claim 1, wherein said error detecting means comprises detectors each relating to a corresponding one of the different types of errors, and each of said detectors detects said corresponding one of the different types of errors and generates a set signal, and wherein said set signal is supplied to a corresponding one of said error track pointer circuits so that said corresponding one of said error track pointer circuits is reset.

11. An error correction control apparatus as claimed in claim 1, wherein each of said error track pointers comprises a flip-flop.

12. An error correction control apparatus as claimed in claim 1, wherein each of said error track pointers comprises a register.

13. An error correction control apparatus as claimed in claim 1, wherein said information is data read out from said plurality of tracks formed on a magnetic tape.

14. An error correction control apparatus as claimed in claim 1, further comprising an internal pointer wherein said internal pointer is set and reset by a syndrome process, and said error correcting means corrects said errors indicated by said internal pointer in addition to said plurality of error track pointers.

* * * * *